United States Patent [19]

Zeliszkewycz

[11] 4,149,497

[45] Apr. 17, 1979

[54] FUEL DELIVERY SYSTEM FOR INTERNAL COMBUSTION ENGINES

[76] Inventor: Stefan Zeliszkewycz, 1854 N. Lake Dr., Troy, Mich. 48084

[21] Appl. No.: 831,362

[22] Filed: Sep. 8, 1977

Related U.S. Application Data

[63] Continuation-in-part of Ser. No. 512,944, Oct. 7, 1974, abandoned.

[51] Int. Cl.² .............................................. F02B 69/00
[52] U.S. Cl. ............................... 123/34 R; 123/33 E; 123/34 A; 123/35; 123/131
[58] Field of Search ................. 123/33 B, 33 C, 34 R, 123/34 A, 35, 33 E, 26, 75 B, 131, 136

[56] References Cited

U.S. PATENT DOCUMENTS

| | | | |
|---|---|---|---|
| 1,207,846 | 12/1916 | Bradford | 123/34 |
| 1,232,777 | 7/1917 | Doble | 123/34 |
| 1,736,647 | 11/1929 | Braren | 123/34 R |
| 2,528,263 | 10/1950 | Chapman | 123/33 C |
| 2,727,498 | 2/1953 | Reiners | 123/140 FG |
| 3,185,140 | 5/1965 | Cumming | 123/140 FG |
| 3,443,552 | 5/1969 | Van Seggern et al. | 123/75 B |
| 3,456,636 | 7/1969 | Marcoux | 123/33 E |
| 3,508,530 | 4/1970 | Clawson | 123/191 S |
| 3,592,175 | 7/1971 | Hamilton | 123/136 |
| 3,814,065 | 6/1974 | Gospodar | 123/75 B |

OTHER PUBLICATIONS

*Diesel and High Compression Gas Engines—Fundamentals*, Kates, 1954, pp. 96-97.

Primary Examiner—Charles J. Myhre
Assistant Examiner—David D. Reynolds
Attorney, Agent, or Firm—Krass & Young

[57] ABSTRACT

A fuel delivery system for an internal combustion engine of the compression ignition-fuel injected type, in which the fuel delivery system includes an arrangement for externally vaporizing the fuel before injection, the arrangement comprising a mixing chamber within which is directed a quantity of compressed air or other gas, and into which is atomized a variable proportion of fuel to form a vaporized fuel-gas mixture. A constant volume of the vaporized fuel-gas mixture is injected into the engine cylinders with the ratio of the vaporized fuel-gas mixture injected into the chambers varied to control the power output of the engine, so that the fuel injectors can be of constant volume design. The quantity of vaporized fuel-gas mixture proportion to the total volume compressed within each engine cylinder is maintained from eight to twelve percent, when air is used as the gas in the mixture such that as the vaporized fuel-air mixture is varied in proportion, the fuel proportion always being high enough to be out of the flammability range while never being increased to the level at which condensation of fuel could occur insuring maintenance of the state of vaporization of the quantity of fuel in the mixture throughout the operating condition of the engine. An analysis of a typical gasoline fuel and a butane fuel in an air mixture is disclosed demonstrating the limits in fuel proportion defined by the flammability and condensation properties of the fuel constituents.

17 Claims, 1 Drawing Figure

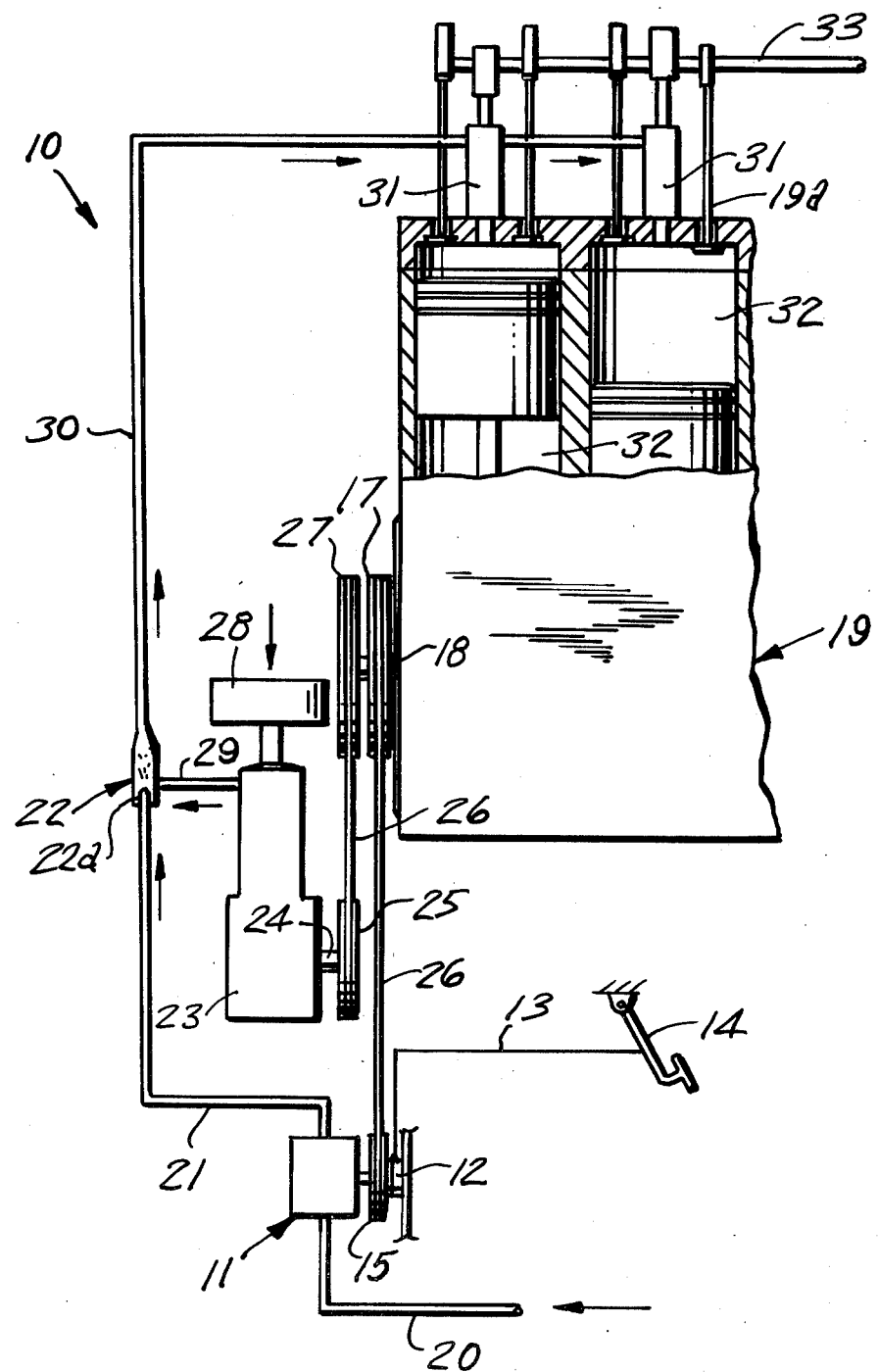

FUEL DELIVERY SYSTEM FOR INTERNAL COMBUSTION ENGINES

This application is a continuation-in-part of Ser. No. 512,944, filed Oct. 7, 1974, now abandoned.

BACKGROUND OF THE INVENTION

1. Field of the Invention

This invention concerns fuel delivery systems and more particularly concerns fuel delivery systems for compression ignition fuel injected internal combustion engines.

2. Description of the Prior Art

The need for sharply reduced noxious emissions from conventional spark ignition carbureted internal combustion engines has led to a decrease in the compression ratios of these engines which in turn has led to a sharply decreased thermal efficiency due to a loss in volumetric efficiency. This is at a time when the efficiency of the engine is becoming increasingly important with the greatly increased costs of petroleum fuels. Diesel engines have not been required to be changed in design to reduce their compression ratios and hence still exhibit relatively good thermal efficiency. However, diesel engines heretofore have been quite expensive to manufacture due to various factors, not the least of which is the high precision variable volume fuel injectors. These injectors must operate at sufficiently high pressure to provide good atomization of the fuel as it is injected into the combustion chamber and in addition the quantity of fuels injected by the injector mechanism must be capable of being varied precisely in order to vary the power output of the engine. The operating requirements of the fuel injectors have contributed substantially to the overall expense of manufacturing these engines and has limited the application of such engines to passenger cars.

While injection mechanisms such as disclosed in the patent to Braren, U.S. Pat. No. 1,736,647, have heretofore been proposed in which the atomization of fuel in the combustion chamber has been aided by the intermixture of a quantity of air in the fuel prior to injection, the fuel injector mechanisms disclosed in that patent are still of variable volume design since the variation in fuel-air mixture available for control of the power output is extremely limited. This is so since the Braren patent discloses a mixture of a relatively minute quantity of air in the fuel such as to entrain air bubbles within the fuel mixture which will expand upon injection to aid in the atomization process. The proportions recited in that patent, i.e., a minimum proportion of fuel is such that the mixture is essentially liquid and remains a liquid or emulsion, as the patent describes it, during injection into the cylinders. Thus, a variable volume injector which is operated at fairly high pressures would still be required in a fuel delivery system according to that patent to provide a practical range of power output of the engine.

A second aspect of the approach of Braren is that all the atomization is still carried out upon injection into the combustion chamber, such that relatively high pressures of the injector are required, which requirement is made more difficult to meet by the compressibility of the liquid-air mixture. Also, the complete vaporization of the fuel in the air compressed in the combustion chamber is not insured.

The time lag between atomization of the fuel in the combustion chamber and the change of state into the vapor phase in conventional diesel engines affects the operating efficiency thereof, causing them to operate at relatively slow speed.

It is therefore an object of the present invention to provide a fuel delivery system for compression ignition fuel injected internal combustion engines in which a constant volume fuel vapor gas injector may be provided which may operate at relatively low pressures.

It is a further object of the present invention to provide a fuel delivery system in which complete and total vaporization of a fuel occurs and is maintained prior to injection such that complete combustion of the fuel in the combustion chamber is insured.

It is a further object of the present invention to provide such a fuel delivery system which is relatively simple in design and rugged in construction such as to insure good reliability in the automotive environment.

SUMMARY OF THE INVENTION

These and other objects, which will become apparent upon a reading of the following specification and claims, are accomplished by a fuel delivery system including a mixing chamber into which is introduced highly compressed gas such as air and a variable quantity of liquid fuel injected through an atomizer into the mixing chamber in such proportions as to insure complete vaporization of the fuel therein. The heat content of the highly compressed gas is utilized to fully vaporize the fuel at the pressures existing in the mixing chamber, thus absorbing the latent heat of vaporization of the liquid fuel atomized into the gas, as well as the heat required to heat the liquid to the vaporization temperature. The resulting fuel vapor-gas mixture is injected into the engine cylinders by means of constant volume injectors by further pressurization sufficient to cause the mixture to enter the combustion chambers in timed relationship with the compression of primary air in the cylinder. The proportions of the fuel vapor-gas mixture are such as to insure complete and total vaporization of the fuel within the compressed gas through the entire range of operating conditions and proportions up to the maximum quantity of proportion of fuel corresponding to the stoichometric mixture within the combustion chamber. In the disclosed embodiment, the atomized fuel is fully vaporized within a quantity of secondary air and the proportions of fuel to secondary air are maintained within the range defined at its lower limit by the leanest non-flammability proportion of the resulting mixture and at its upper limit by the proportion of fuel able to be maintained in a vaporized state within the quantity of secondary air throughout the operating conditions. This quantity of air for gasoline or other common fuels such as butane is from eight to twelve percent by volume of the secondary air to the total quantity of air to be compressed within the combustion chamber during the engine cycle. The quantity of fuel is varied by means of a variable delivery fuel pump which in turn controls the power output of the engine to thus provide a simple fuel delivery control which allows the use of constant volume injectors and insures complete dispersion of the fuel in the combustion chamber.

DESCRIPTION OF THE DRAWING

The FIGURE is a diagrammatic representation of internal combustion engine and fuel delivery system according to the present invention.

DETAILED DESCRIPTION

In the following detailed description, certain specific embodiments will be described in accordance with the requirements of 35 USC 112 and specific terminology utilized in the interest of clarity, but it is to be understood that the same is not intended to be limiting and indeed should not be so construed inasmuch as the invention is capable of taking many forms and variations within the scope of the appended claims.

It should be noted at the outset that the present invention contemplates the handling of the fuel in a vaporized fuel-gas mixture formed externally of the engine and further contemplates the variation of the quantity of fuel vaporized within a given volume of gas, which gas serves as the vehicle within which the fuel is to be vaporized. This gas is initially highly compressed, with the resulting adiabatic temperature rise allowing the gas to serve as a heat source to heat the liquid fuel to its vaporization temperature and to absorb the latent heat of vaporization of the fuel. In the disclosed embodiment, this gas is selected to be air.

The proportions of the vaporized fuel-air mixture of this system differs however from conventional carburetion both internal and external, in that the mixture of gas or air in fuel is not in proportion such as could be burned within the combustion chamber, but rather comprises a super rich noncombustible mixture which is injected into the primary quantity of air compressed within the combustion chamber. This mode of introduction of the fuel-air mixture into the chamber is fundamentally different from carbureted engines. The introduction of the fuel-air mixture in carbureted engines cannot be by injection inasmuch as a combustible mixture may ignite within the delivery system if compressed sufficiently to be injected during the compression stroke.

This super rich mixture is varied in the proportion of fuel vaporized therein in order to control the power output of the engine.

In the instance where air is utilized as the vehicle gas, the present system envisions maintenance of the vaporized fuel proportion to be above the limit of flammability since as contrasted with carbureted systems, the vaporized fuel-air mixture is injected at relatively high pressures into the engine combustion chambers. This is so because as noted the compression of the primary air is timed with the injection of the vaporized fuel-air mixture such that the injector must have sufficient pressures to overcome the compression pressures existing within the cylinder.

At the other end of the range, the vaporized fuel-air mixture must be proportioned with the relationship to quantity of total air such that at its maximum proportion, the fuel is totally vaporized so as to not allow liquid fuel to accumulate in the system. Thus, at the high end of the range of fuel proportions, the quantity of secondary air must be adequate to insure that all of the components of the liquid fuel may be vaporized within the quantity of secondary air at the temperature level reached in the mixing chamber by compression of the secondary air or other gas utilized as a vehicle. The presence of significant quanities of liquid fuel of course would lead to malfunctioning of the fuel delivery system due to the accumulation of the liquid in the lines and injectors.

Accordingly, the present invention contemplates the formation of a mixture of gas and fuel externally of the engine in which mixture the fuel remains in vaporized form throughout the range of operating conditions of the engine and, in the case where compressed air is used as the vehicle gas, the leanest mixture produced remains above the flammability range of the particular fuel.

Below are set forth proportions of examples of fuels based on the selection of a lower limit of the proportion by volume of secondary air possible by the above-established criteria.

The secondary air is compressed to a pressure selected to be 235 psia in order to produce a mixture of sufficient density to be able to be injected with injectors of a feasible design. This also raises the temperature and heat content of the air sufficiently to vaporize the quantity of fuel introduced into the air heating the liquid and absorbing the latent heat of vaporization as it vaporizes.

Example I is with respect to the major components of the typical gasoline mixture, ignoring very minor components of lighter and heavier molecular weight and Example II is with respect to butane. These examples are based on an analysis generally which insures that the quantity of air is sufficient such that the saturated vapor pressure at the proportion of fuel at the maximum ratio in the quantity of secondary air set forth is sufficient to insure complete vaporization of the fuel components at the temperature levels existing within the mixing chamber.

EXAMPLE I

Vaporization processes in the mixing chamber. Pressure in the mixing chamber $P_t=235$ psia Maximum amount of fuel used in the engine is the amount required for stoichometric combustion which is 15 pounds air for 1 pound fuel.

In the delivery system proposed, amount of secondary air used is 8% of total air taken in. Therefore, ratio of air to fuel is 1.2 pounds air to 1 pound fuel.

Vaporization of average grade gasoline. Composition of average grade gasoline in a simplified form compiled from data given in the reference book, "The Chemical Constituents of Petroleum" by A. N. Sachanen, D.Sc., Reinhold Publishing Corp., N.Y. USA

| PARAFINS | Molecular Weight | % By Weight | Heat of Vaporization |
| --- | --- | --- | --- |
| Pentane $C_5H_{12}$ | 72 | 14 | 153.9 Btu/lb |
| Hexane $C_6H_{14}$ | 86 | 30 | 143.9 Btu/lb |
| Heptane $C_7H_{16}$ | 100 | 15 | 136.8 Btu/lb |
| Octane $C_8H_{18}$ | 114 | 6 | 131.6 Btu/lb |
| Nonane $C_9H_{20}$ | 128 | 4 | 127.1 Btu/lb |
| NAPHTHENES | | | |
| Methylcyclo Pentane $C_6H_{12}$ | 84 | 5 | 170.1 Btu/lb |
| Cyclo Hexane $C_6H_{12}$ | 84 | 10 | 153.7 Btu/lb |
| Methylcyclo Hexane $C_7H_{14}$ | 98 | 10 | 157.0 Btu/lb |
| AROMATICS | | | |
| Benzene $C_6H_6$ | 78 | 1.2 | 169.5 Btu/lb |
| Toluene $C_7H_8$ | 92 | 1.8 | 156.2 Btu/lb |
| Ethyl Benzene & Xylenes $C_8H_{10}$ | 106 | 3.0 | 145.8 Btu/lb |

Partial pressures, necessary for determination of condensation temperatures, are arrived at by applying Dalton's Law for Mixture of Perfect Gases. It is noted that in this example, vapors of various components of gasoline are treated as being perfect gases.

Formula 2-15 from Engineering Manual by Perry is used.

$$p_i = X_i \times p_t$$

$$X_i = \frac{n_i}{n_t}$$

$p_i$ = partial pressure of component
$p_t$ = total pressure of mixture
$X_i$ = mole fraction of component
$n_i$ = mole quantity of component
$n_t$ = mole quantity of mixture Mole Quantities of Components
In a Mixture Containing
1.2 pounds Air & 1 pound Gasoline Mole Fractions of Components
($X = n_{component}/n_t$)

| Component | | | | |
|---|---|---|---|---|
| Pentane n | = | $\frac{0.14}{72}$ | = 0.00194 | X = 0.0369 |
| Hexane n | = | $\frac{0.30}{86}$ | = 0.00348 | X = 0.0662 |
| Heptane n | = | $\frac{0.15}{100}$ | = 0.00150 | X = 0.0285 |
| Octane n | = | $\frac{0.06}{114}$ | = 0.00053 | X = 0.0101 |
| Nonane n | = | $\frac{0.04}{128}$ | = 0.00031 | X = 0.0058 |
| Methylcyclo Pentane n | = | $\frac{0.05}{84}$ | = 0.00059 | X = 0.0112 |
| Cyclohexane n | = | $\frac{0.10}{84}$ | = 0.00119 | X = 0.0227 |
| Methylcyclo Hexane n | = | $\frac{0.10}{98}$ | = 0.00102 | X = 0.0194 |
| Benzene n | = | $\frac{0.012}{78}$ | = 0.00015 | X = 0.0029 |
| Toluene n | = | $\frac{0.018}{92}$ | = 0.00020 | X = 0.0038 |
| Ethylbenzene & Xylenes n | = | $\frac{0.030}{106}$ | = 0.00028 | X = 0.0053 |
| Air n | = | $\frac{1.2}{29}$ | = 0.04138 | X = 0.7871 |
| $\Sigma n_i = n_t$ | | | = 0.05257 | $\Sigma X_i$ = 1.0000 |

Data from chart FIGS. 3–5 and Table 3–23 in Engineering Manual by Perry are used to determine saturated vapor temperature corresponding to partial pressure for each component.

| Partial Pressure of Component in psia | | Saturated Vapor Temperature | Heat Required To Vaporize Component |
|---|---|---|---|
| Pentane p | = X × Pt = 0.0369×235=8.67 | 70° F. | 21.54 |
| Hexane p | = X × Pt = 0.0662×235=15.56 | 160° F. | 43.17 |
| Heptane p | = X × Pt = 0.0285×235=6.70 | 164° F. | 20.52 |
| Octane p | = X × Pt = 0.0101×235 =2.37 | 156° F. | 7.90 |
| Nonane p | = X × Pt = 0.0059×235=1.39 | 170° F. | 5.09 |
| Methylcyclo Pentane p | = X × Pt = 0.0112×235=2.63 | 80° F. | 8.50 |
| Cyclopentane p | = X × Pt = 0.0227×235=5.33 | 114° F. | 15.37 |
| Methylcyclo Hexane p | = X × Pt = 0.0194×235=4.56 | 147° F. | 15.70 |
| Benzene p | = X × Pt = 0.0029×235=0.68 | 46° F. | 2.03 |
| Toluene p | = X × Pt = 0.0038×235=0.89 | 96° F. | 2.81 |
| Ethylbenzene Xylene p | = X × Pt = 0.0053×235=1.25 | 67° F. | 4.37 |
| Air p | = X × Pt = 0.7871×235=184.97 | | |
| $\Sigma p_i$ | = | 235.00 | 147.00 |

Object of the system is to fully vaporize all components of fuel in the mixing chamber meaning that temperature of vaporized fuel-air mixture should not fall below 170° F.

Hot weather conditions: temperature of air and fuel would be 100° F.

Normal weather conditions: using preheating along exhaust manifold, temperature of secondary air 100° F.; temperature of fuel 100° F.; secondary air temperature 560° R.; pressure ratio of secondary air compressor 16:1, adiabatic temperature rise factor 2.208; final temperature after compression 560°×2.208°=1236° R. or 776° F.

Temperature drop due to vaporizing effect of gasoline specific heat of air $C_p$=0.24 Btu/lb° F. or 0.24×1.2=0.288 Btu/1.2 lbs° F.

Temperature drop=147°/0.288°=510° F.

In addition, heat is required to bring gasoline to vaporizing temperature of average 140° F. Specific heat of gasoline=0.50 Btu/lb° F. Heat required=(140−100)×0.50=20 Btu.

Temperature drop due to warming of liquid gasoline=20°/0.288°=70° F.

Total temperature drop=510°+70°=580° F.

Final temperature of the mixture=776°−580°=196° F.

Since final temperature of mixture is higher than 170° F., no recondensation of vaporized fuel will occur.

Cold weather conditions: When starting in subzero temperatures, it is assumed that initial fuel input is about 33% of maximum quantity required.

Air-fuel ratio is as follows:

1.2 lb air to 0.33 lb gasoline.

Check partial pressure of nonane, which is highest boiling hydrocarbon:

Partial pressure of butane necessary for determination of vaporization temperature is calculated by applying Dalton's Law for Mixture of Perfect Gases.

Formula 2-15 from Engineering Manual by Perry is used.

$$p_i = X_i \times p_t$$

| | Mole Quantities | | | | Mole Fractions | | |
|---|---|---|---|---|---|---|---|
| Nonane n | = | $\frac{0.01333}{128}$ | = 0.000104 | Nonane X | = $\frac{n_{non}}{n_t}$ | = $\frac{0.000104}{0.045074}$ | = |
| Rest of hydro carbons n | = | | = 0.00359 | | | 0.00231 | |
| Air n | = | $\frac{1.2}{29}$ | = 0.04138 | | | | |
| $\Sigma n_i = n_t$ | | | = 0.045074 | | | | |

Partial pressure of nonane $p_{non} + X_{non} \times p_t = 0.00231 \times 235 = 0.543$ psia.

Saturated vapor temperature of nonane = 130° F.

Assume temperature of air and gasoline to be −20° F. or 440° R.; pressure ratio 16:1; adiabatic temperature rise factor 2.208; final temperature after compression 440° × 2.208° = 971° R. or 511° F.

$$X_i = n_i/n_t$$

Butane $C_4H_{10}$; Molecular Weight 58; Heat of Vaporization 165.8 Btu/lb° F.

| Butane n | = | $\frac{1}{58}$ | = 0.01724 | Butane X | = $\frac{n_{but}}{n_t}$ | = $\frac{0.01724}{0.06138}$ | = 0.2809 |
|---|---|---|---|---|---|---|---|
| Air n | = | $\frac{1.28}{29}$ | = 0.04414 | Air X | = $\frac{n_{air}}{n_t}$ | = $\frac{0.04414}{0.06138}$ | = 0.7191 |
| $\Sigma n_i$ | = | $n_t$ | = 0.06138 | $\Sigma X_i$ | | = | 1.0000 |

Temperature drop due to vaporizing effect of fuel:

$$\text{temperature drop} = \frac{147 \times 0.33}{0.288} \; 168° \text{ F.}$$

Temperature drop due to warming of liquid gasoline from −20° F. to 130° F.:

$$\text{temperature drop} = \frac{150 \times 0.5 \times 0.33}{0.288} = 86° \text{ F.}$$

Total temperature drop = 168° + 86° = 254° F.

Final temperature in the mixing chamber = 511° − 254° = 257° F.

Since final temperature of mixture is higher than 130° F., no recondensation of vaporized fuel will occur.

After start secondary air and fuel will soon pick up heat during contact with exhaust manifold, their temperature will gradually rise until it reaches normal operation condition of 100° F.

EXAMPLE II

Maximum amount of butane used in the engine is the amount required for stoichometric combustion which is 16 pounds air for 1 pound butane.

In the fuel delivery system proposed, amount of secondary air used is 8% of total air taken in, therefore, ratio of air to fuel is 1.28 pounds air to 1 pound butane.

Pressure in the mixing chamber is $p_t = 235$ psia.

Partial pressure of butane $p_{but} = X_{but} \times p_t = 0.2809 \times 235 = 66$ psia.

Saturated vapor temperature at 66 psia of butane is 118° F. (see FIGS. 3-5 chart in the Engineering Manual by Perry.

Hot weather conditions: temperature of air and fuel 100° F.

Normal conditions: using preheating along exhaust manifold temperature of secondary air 100° F.; temperature of fuel 100° F.; secondary air temperature 560° R.; pressure ratio of auxiliary air compressor 16:1; adiabatic temperature rise factor 2.208.

Final temperature of secondary air after compression 560° × 2.208° = 1236° R. or 1236° − 460° = 776° F.

Temperature drop due to vaporizing effect of butane specific heat of air $C_p = 0.24$ Btu/lb° F. or 0.24 × 1.2 = 0.288 Btu/1.2 lbs° F.

Temperature drop 165.8°/0.288° = 576° F.

Temperature drop due to warming of liquid butane.

Temperature rise 118° − 100° = 18° F. Specific heat of liquid butane = 0.50 Btu/lb° F.

Heat required = 18 × 0.5 = 9 Btu

Temperature drop = 9°/0.288° = 31° F.

Total temperature drop = 576° + 31° = 607° F.

Final temperature of mixture = 776° − 607° = 169° F.

Since final temperature of mixture is higher than 118° F., no recondensation of vaporized fuel will occur.

Cold weather starting conditions: When starting in subzero temperatures, it is assumed that initial fuel input is about 33% of maximum quantity required.

Air-fuel ratio is as follows:

1.28 lbs air to 0.33 lbs butane

| Butane n | = | $\frac{0.33}{58}$ | = 0.00569 | Butane X | = $\frac{n_{but}}{n_t}$ | = $\frac{0.00569}{0.04983}$ | = 0.1142 |
|---|---|---|---|---|---|---|---|
| Air n | = | $\frac{1.28}{29}$ | = 0.04414 | Air X | = $\frac{n_{air}}{n_t}$ | = $\frac{0.04414}{0.04983}$ | = 0.8858 |

| $\Sigma n_i$ | = | 0.04983 |
|---|---|---|

Partial pressure of butane = $X_{but} \times p_t = 0.1142 \times 235 = 26.84$ psia.

Saturated vapor temperature of butane = 62° F.

Assume temperature of air and butane to be −20° F. or 440° R.; pressure ratio of secondary air compressor 16:1; adiabatic temperature rise factor 2.208.

Final temperature of secondary air after compression $440° \times 2.208° = 971°$ R. or 511° F.

Temperature drop due to vaporizing effect of butane $$\text{Temperature drop} = \frac{165 \times 0.33}{0.24 \times 1.28} = \frac{54.7}{0.307} = 178° \text{ F.}$$

Temperature drop due to warming of liquid butane from −20° F. to 62° F.

$$\text{Temperature drop} = \frac{82 \times 0.5 \times 0.33}{0.307} = 44° \text{ F.}$$

Total temperature drop = 178° + 44° = 222° F.

Final temperature in the mixing chamber = 511° − 222° = 289° F.

Since final temperature of mixture is higher than 62° F., no recondensation of vaporized fuel will occur.

At part load conditions, fuel delivery rate to the engine is much lower and has to be in such limits as to prevent any possibility of self-ignition.

The ratio of fuel vapor to air in the mixture has to stay at all times above the upper inflammability limit.

Limits of inflammability for fuel vapor-air mixtures:

|  |  | Fuel Vapor in % by Volume | |
|---|---|---|---|
|  |  | Lower Limit | Upper Limit |
| Butane | = | 1.5 | 8.5 |
| Gasoline | = | 1.4 | 7.0 |

Therefore, in order to prevent self-ignition, minimum content of fuel vapor in 1000 parts air is:

Butane vapor—94 parts in 1000 parts air

Gasoline vapor—76 parts in 1000 parts air

From previous calculations, maximum content of fuel vapor in 1000 parts air is:

Butane vapor—390 parts in 1000 parts air

Gasoline vapor—270 parts in 1000 parts air

In terms of parts of liquid fuel in 1000 parts air:

Liquid butane—0.423 min-1.767 max in 1000 parts air 4.15:1 fuel ratio max to min.

Liquid gasoline—0.452 min-1.605 max in 1000 parts air 3.55:1 fuel ratio max to min.

It can thus be seen that the vaporized fuel ratio may be varied, with secondary air being utilized as the vehicle gas, in the case of liquid butane from 4.15:1 and with gasoline from 3.55:1, maximum fuel proportion to minimum fuel proportion for the given quantity of secondary air. Such ratios will provide adequate control over the power output of the engine such that a constant volume injector may be utilized.

Similar calculations have indicated that the upper range of secondary air possible would be on the order of twelve percent before the flammability limits would begin to be reached during part-load conditions.

According to the present invention, a fuel delivery system 10 is shown which includes a fuel pump 11 of constant volume design having a variable speed mechanical drive control device 12 operated by means of a flexible control cable 13 secured to the accelerator pedal lever 14.

The drive control device 12 may also be a variable speed electric motor drive, or a variable speed hydraulic drive and a third alternative is to substitute pump 11 and device 12 for a fuel pump of variable volume, but constant drive.

The principle object of the fuel pump 11 is to deliver fuel at high pressure to a mixing chamber 22 in variable quantities as required.

The control of fuel pump 11 as shown in the drawing is accomplished by means of flexible control cable 13 attached to the accelerating pedal lever 14 of the vehicle. Thus, fuel pump 11 is driven by means of a variable diameter pulley 15 operated by the control device 12, which variable diameter pulley 15 carries an endless belt 16 which is operated by means of pulleys 17 secured fixedly to crankshaft 18 of the internal combustion engine 19.

A fuel inlet line 20 provides transport means for the fuel into pump 11 and output line 21 provides for the passage of fuel under pressure to the mixing chamber 22.

An air compressor 23 is connected by shaft means 24 to pulley 25 which is driven by means of belt 26 carried upon pulley 27 fixedly secured to crankshaft 18 of engine 19. Air compressor 23 is of small size and is of a suitable constant volume design, i.e., piston or positive displacement rotary design. The air compressor 23 compresses a quantity of air which when injected comprises from eight to twelve percent of the total of air charge. This compressed air which is termed "secondary air" is compressed to a pressure of sixteen atmospheres (235 psia) to produce a density sufficient for practical injection as will be described, and also to raise the temperature and heat content of the secondary air for full vaporization of atomized fuel.

This compressed secondary air is delivered to the mixing chamber 22 where it is used as a gaseous vehicle within which to vaporize the fuel which is thus sprayed in varying quantities into the chamber 22 through the nozzle 22a. The nozzle 22a is of such structure so as to effect a fine form of atomization of the fuel to insure vaporization in the air.

The remaining 88 to 92 percent of the air charge, called "primary air", is taken into the engine 19 in the conventional way through the intake valves 19a.

Air compressor 23 is provided with an air filter 28 on the intake portion of compressor 23 and an output line 29 is secured to the mixing chamber 22 so as to provide passageway means for the compressed air entering mixing chamber 22. The vaporized fuel and air within mixing chamber 22 travels through the output line 30 of mixing chamber 22, line 30 being connected to each of the eccentric or crank operated compressor injectors 31, one each being secured within the combustion chamber 32 of engine 19. Linkage to overhead cam shaft 33 provides for the proper timing sequence of the compressor injectors.

It shall further be noted that the mixing chamber 22 will receive, per one revolution of the engine 19, a constant quantity of secondary air, but can receive varying quantities of fuel, thus providing the variable fuel secondary air ratio of the mixture which will be delivered to each of the combustion chambers 32 of engine 19.

The mixture is delivered to the combustion chamber 32 by means of small-sized tubes and injected into each of the combustion chambers 32 by means of constant volume compressor-injectors 31. The compressor-injector 31 is of a constant volume design and its function is to bring the fuel-secondary air mixture to its final injection pressure, which is greater than the mixture pressure in the combustion chamber 32, typically requiring another 3:1 compression of the mixture.

The construction of the compressor-injector 31 is basically a cylinder piston type gas injector of considerably simple design, because it works on a constant volume delivery principle and at relatively low pressures. The injection pressure and a suitable injector outlet nozzle will provide thorough mixing of the vaporized fuel-air mixture with the compressed primary air in the combustion chamber 32. Ignition of the charge in the combustion chamber 32 will occur due to the high temperature of the compressed primary air, as occurs in diesel engines.

It is also noted that the fuel delivery system 10 will function most advantageously upon supercharged engines, when the division of primary and secondary charged air is undertaken after the air has been compressed in the supercharger.

While a specific example has been disclosed with respect to gasoline and butane and the use of air as a gas vehicle, it is of course understood that the principles may be applied to a wide range of fuels and in addition other gases may be used as the vehicle forming the vaporized fuel gas charge in the mixing chamber such as the exhaust gas of the vehicle. In such instances, the flammability proportion of course may drastically differ to allow the use of different proportions of fuel to the vapor-gas mixture.

The embodiments of the invention in which an exclusive property or privilege is claimed are defined as follows:

1. An internal combustion engine including:
at least one combustion chamber;
means for introducing a quantity of air into said combustion chamber;
means for compressing said quantity of air introduced into said combustion chamber;
means for forming a mixture of a quantity of gas and a quantity of vaporized fuel externally of said combustion chamber, said means including a mixing chamber, means for atomizing said quantity of fuel in said mixing chamber, and means compressing said quantity of gas and introducing said compressed quantity of gas into said mixing chamber, said quantity of gas being compressed sufficiently to raise its temperature to enable complete vaporization of said quantity of atomized fuel therein to form said vaporized fuel-gas mixture, means varying the ratio of vaporized fuel to said quantity of gas, said means maintaining said ratio such as to insure maintenance of total vaporization and non-combustibility of said fuel in said gas;
injector means for injecting a quantity of said mixture of gas and vaporized fuel into said compressed quantity of air in said combustion chamber in timed relationship with the said compression of said quantity of air, said injector means including means pressurizing said fuel-gas mixture to a pressure sufficient to enable said mixture to be forced into said combustion chamber at the end of said compression of air in said cylinder, whereby said vaporized fuel may be burned in said combustion chamber upon ignition thereof.

2. The internal combustion engine according to claim 1 wherein said means for compressing said quantity of air compresses said air to raise the temperature sufficiently to ignite said vaporized fuel carried in said quantity of mixture injected into said combustion chamber.

3. The internal combustion engine according to claim 1 wherein said means injecting said quantity of mixture into said combustion chamber injects a constant volume of said mixture for each engine cycle.

4. The internal combustion engine according to claim 1 wherein said means forming said mixture of a gas and vaporized fuel includes:
air compressor means directing a quantity of compressed air into said mixing chamber; and
wherein said atomizing means sprays said fuel into said quantity of compressed air in said mixing chamber, whereby said vaporization of said fuel in said compressed air is carried out.

5. The internal combustion engine according to claim 4 wherein said air compressor means includes a constant volume air compressor and means driving said air compressor by said internal combustion engine delivering a constant volume of air to said mixing chamber for each cycle of said internal combustion engine, said constant volume comprising 8 to 12 percent of total air intake of said engine.

6. The internal combustion engine according to claim 5 wherein said means injecting a quantity of said mixture of a gas and vaporized fuel injects a quantity containing approximately from eight to twelve percent by volume of the total gas compressed in said combustion chamber after injection of said mixture.

7. The internal combustion engine according to claim 6 wherein said fuel comprises gasoline.

8. The internal combustion engine according to claim 6 wherein said fuel comprises butane.

9. The internal combustion engine according to claim 4 wherein said means injecting said quantity of said mixture into said combustion chamber includes a constant volume fuel vapor-gas injector and wherein said internal combustion engine further includes means driving said fuel vapor-gas injector to produce injection of said mixture into said combustion chamber at the end of compression of said quantity of air.

10. The internal combustion engine according to claim 4 wherein said means varying the proportion of vaporized fuel mixed with said quantity of compressed air varies said proportion of fuel solely within the upper non-flammability range of said fuel-air mixture.

11. The internal combustion engine according to claim 4 wherein said air compressor means compresses said quantity of air in a ratio of 16:1 in said mixing chamber.

12. The internal combustion engine according to claim 7 wherein said gasoline fuel is mixed with said compressed air inside said mixing chamber in the following proportions:
minimum: 0.452 volume parts of liquid gasoline in 1000 standard volume parts of air
maximum: 1.605 volume parts of liquid gasoline in 1000 standard volume parts of air.

13. The internal combustion engine according to claim 8 wherein said butane fuel is mixed with said compressed air inside said mixing chamber in the following proportions:
  minimum: 0.432 volume parts of liquid butane in 1000 standard volume parts of air
  maximum: 1.767 volume parts of liquid butane in 1000 standard volume parts of air.

14. The internal combustion engine according to claim 4 wherein said fuel comprises gasoline and wherein said gasoline fuel is mixed with said compressed air inside said mixing chamber in the following proportions:
  minimum: 0.452 volume parts of liquid gasoline in 1000 standard volume parts of air
  maximum: 1.605 volume parts of liquid gasoline in 1000 standard volume parts of air.

15. The internal combustion engine according to claim 4 wherein said fuel comprises butane and wherein said butane fuel is mixed with said compressed air inside said mixing chamber in the following proportions:
  minimum: 0.432 volume parts of liquid butane in 1000 standard volume parts of air
  maximum: 1.767 volume parts of liquid butane in 1000 standard volume parts of air.

16. The internal combustion engine according to claim 1 wherein said means varying the ratio of said fuel in said mixture comprises variable fuel delivery pump means deliverying a time variable quantity of fuel to said mixing chamber.

17. The internal combustion engine according to claim 4 wherein said means varying the proportion of vaporized fuel within said quantity of compressed air varies said proportion of fuel between a lower limit above the flammability proportion of said vaporized fuel in said quantity of air and an upper limit of said ratio producing a stoichometric proportion in said quantity of air upon injecting said quantity of said mixture into said combustion chamber.

* * * * *